United States Patent
Baba et al.

(10) Patent No.: US 6,892,107 B2
(45) Date of Patent: May 10, 2005

(54) PLANT CONTROL MONITOR

(75) Inventors: Takaharu Baba, Osaka (JP); Yosimi Ogawa, Hyogo (JP); Akio Kojima, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 48 days.

(21) Appl. No.: 10/399,726

(22) PCT Filed: Oct. 18, 2001

(86) PCT No.: PCT/JP01/09135

§ 371 (c)(1), (2), (4) Date: Jul. 31, 2003

(87) PCT Pub. No.: WO02/35302

PCT Pub. Date: May 2, 2002

(65) Prior Publication Data

US 2004/0030429 A1 Feb. 12, 2004

(30) Foreign Application Priority Data

Oct. 20, 2000 (JP) .................................. 2000-320444

(51) Int. Cl.⁷ ............................................. G06F 19/00
(52) U.S. Cl. .......................... 700/108; 700/80; 700/96
(58) Field of Search ................... 700/80, 83, 95, 700/96, 108, 109, 110, 174, 175; 715/514

(56) References Cited

U.S. PATENT DOCUMENTS 5,412,400 A * 5/1995 Takahara et al. ............ 715/788
5,777,896 A * 7/1998 Arita et al. .................. 702/185

FOREIGN PATENT DOCUMENTS

| JP | 62-084308 | 4/1987 |
| JP | 05-035328 | 2/1993 |
| JP | 06-137909 | 5/1994 |
| JP | 09-128036 | 5/1997 |
| JP | 09-138703 | 5/1997 |
| JP | 10-083218 | 3/1998 |
| JP | 11-119825 | 4/1999 |
| JP | 11-149312 | 6/1999 |
| JP | 2000-112521 | 4/2000 |
| JP | 2000-249782 | 9/2000 |

* cited by examiner

*Primary Examiner*—Leo Picard
*Assistant Examiner*—Charles Kasenge
(74) *Attorney, Agent, or Firm*—Marshall, Gerstein & Borun LLP

(57) ABSTRACT

An object of the present invention is to quickly and accurately detect disorder or abnormality of a process state which occurs in a plant and to appropriately perform an operation for normalizing disorder or abnormality of the process without depending on experience or skill of an operator.

A control system of the plant is divided into groups having relation, such as, the plant, processes, or steps, and a monitor picture is created for each of them. When an alarm is raised, the alarm is displayed on a picture associated with the alarm. A guidance picture for supporting how to deal with the alarm is provided.

54 Claims, 11 Drawing Sheets

PLANT CONTROL MONITOR

DESCRIPTION

1. Technical Field

The present invention relates to a system for monitoring operation control of various manufacturing plants for manufacturing products, such as chemical product manufacturing plants, petroleum chemical product manufacturing plants, oil refining plants, iron and steel product manufacturing plants, food manufacturing plants, paper and pulp product manufacturing plants, drug manufacturing plants, automobile manufacturing plants, mechanical product manufacturing plants, or electric appliance manufacturing plants, or power plants, waste treatment plants, and the like.

2. Background Art

Conventionally, a distributed control system (DCS) and an upper computer system for controlling and monitoring the DCS have been used to control and monitor operations of manufacturing plants. These are called plant control monitoring systems.

The DCS comprises a CRT or liquid crystal display device for displaying operating states of devices or equipment, or processes within the plant, thereby controlling and monitoring the plant. The conventional display device generally displays a graphic picture describing the process of the plant in the form of a process flow diagram (P & ID). This makes it possible to visually check a control state of the plant.

The upper computer system is configured to output a management value required for optimum operation in terms of quality, efficiency, safety of installation or process, etc, based on a process state signal or a variable which is delivered from the DCS, or based on a process signal obtained by processing the process state signal or the variable as desired. An operation manager (operator) totally judges these information, and performs some activity (action) on the operation of the plant.

In the conventional plant control monitoring system, when the process state signal or the process signal to be handled by an instrument (such as a pressure indicator, a temperature indicator, a flow rate indicator, or a liquid level indicator) which is installed on the plant, exceeds a preset reference value, an alarm is notified for each instrument.

In the conventional plant control monitoring system, graphic representation is displayed on a screen of the display device using diagrams, symbols, texts, and the like, for each instrument. When the alarm is raised (a certain deviation state occurs in the process), the diagram, the symbol, or the texts is individually color-changed or blinked, thus notifying the operator of the alarm. When the instruments are represented by means of the diagrams, the symbols, the texts, and the like and the entire plant is represented by the graphic picture, a plurality of graphic pictures are needed. In particular, a huge plant requires a great many graphic pictures.

Upon the alarm being raised in the plant using the plurality of graphic pictures, it is necessary to check this alarm and display a picture representing required operation (picture including the device or equipment in the deviation state). To this end, conventionally, the pictures are numbered and by entering a number, the corresponding picture is displayed, or pictures where alarms tend to appear are statistically or empirically specified, and are displayed through one touch by a picture switching means provided on a key board or the like at the time when the alarm is raised. Or, alternatively, a number of CRT pictures are prepared and specific pictures among them, where alarms tend to appear, are always displayed.

The conventional plant control monitoring system has problems as described below.

In order to quickly display a required picture when an alarm is raised, the operator needs to remember numbers of the respective pictures. But, the number of pictures which the operator can remember is limited.

When the entire plant is represented by a plurality of pictures, a plurality of CRT or liquid crystal devices, and a plurality of operators are necessary to monitor a wide range of the process, and frequent picture switching is necessary in actual monitoring.

In other words, since the range of the plant which can be monitored by one operator, i.e., the number of instruments which can be monitored by one operator is limited, a number of operators and display devices and frequent picture switching are needed for monitoring the plant including a great many instruments.

On the other hand, when disorder or abnormality of the process state that has occurred in the plant causes alarms relating to a number of instruments in a chain reaction. In that case, the operator must quickly and accurately detect a cause of the disorder or abnormality (origin of many alarms). Further, the operator needs to perform some operation to normalize the disorder or abnormality in the process. In that case, the operator needs to find out the associated process state signal or the associated instrument, and perform some operation based on these information.

Specification of the cause of the alarm or judgment or handling of the disorder or abnormality varies from operator to operator depending on their technical and empirical abilities. This makes it difficult to achieve stable and safe operation of the plant and uniform quality of products.

DISCLOSURE OF THE INVENTION

The present invention has been developed under the circumstances. An object of the present invention is to provide a plant control monitoring system capable of quickly and accurately detecting disorder or abnormality in a process state which occurs in a plant. Another object of the present invention is to provide a plant control monitoring system capable of appropriately performing an operation for normalizing the disorder or abnormality of the process without depending on experience or skill of the operator.

To achieve the above objects, inventors discovered that, if a display device has a required layer picture structure including from an upper picture representing the entire plant to a lower picture representing individual devices or equipment included in the plant and a picture in each layer is displayed as desired, then which of points being measured abnormality has occurred on is detected quickly and accurately and an operation for dealing with the abnormality is appropriately performed.

(1) According to the present invention, there is provided a plant control monitoring system comprising: a display device configured to display operating states of a plurality of devices or equipment included in each process of a plant by using predetermined symbols; and a processing unit having an alarm output portion for outputting an alarm signal and causing the display device to display an alarm, when judging that an operation of a device or equipment is in a deviation state; the display device including: a first layer picture configured to represent an operating state for each device or equipment, and an upper layer picture configured to represent an operating state for each of groups into which devices or equipment are hierarchically divided so as to be associated with one another; a simple display means for simply displaying a simple display portion configured to simply display an operating state of a lower layer group, the same layer group, or an upper layer group, on the first layer picture or the upper layer picture; and a picture switching means for switching picture display as desired.

In accordance with this configuration, the picture switching means is capable of performing switching of the picture displayed by the display device as desired. Specifically, the picture switching means is capable of performing switching from the first layer picture to the upper layer picture as desired. The alarm output means displays the alarm. When the alarm is raised in a device or equipment, a picture including the device or equipment being in a disorder state is easily displayed by sequential switching from the upper to lower picture.

In addition, when a picture in a layer is being displayed, the simple display means can simply display a picture in a lower layer, the same layer or an upper layer. So, when the deviation state has not occurred in another device or equipment included in the picture being displayed but has occurred in a device or equipment included in another picture, it is possible to display an event that the alarm has been raised in a group to which the picture including the device or equipment being in the deviation state belongs.

Specifically, when a first layer picture including a device or equipment is being displayed and an alarm appears in another first layer picture including another device or equipment, this is simply displayed.

The upper layer picture includes at least a plant-base layer picture configured to represent the entire plant as having groups into which steps represented by the first layer pictures are divided so as to be associated with one another.

With this configuration, in the case where the picture representing the entire plant is displayed, when a deviation state occurs in a device or equipment, thereby causing an alarm to be raised, it is possible to perform switching to the first layer picture to which this device or equipment belongs.

The upper layer picture includes at least a process-base layer picture configured to represent groups into which steps represented by the first layer pictures are divided for each process; and a plant-base layer picture configured to represent processes represented by the process-base layer pictures as being integrated for each plant.

With this configuration, in the case where the picture representing the entire plant is being displayed, when a deviation state occurs in a device or equipment, thereby causing an alarm to be raised, it is possible to perform switching to a process-base layer picture including a process to which the corresponding device or equipment belongs and then to a first layer picture representing a step included in the process.

(2) The alarm output means includes an alarm grouping means configured to display the alarm in a first layer picture associated with the alarm and an upper layer picture associated with the first layer picture, when outputting the alarm signal.

With this configuration, when the alarm is raised while any one layer picture is displayed, the alarm can be displayed in all pictures associated with the alarm. Therefore, by tracing the alarm by sequential switching from a layer picture being displayed, it is possible to easily and quickly reach the picture including the device or equipment being in the deviation state.

The alarm grouping means includes a display configuration changing means for changing a display configuration according to importance of the alarm.

With this configuration, it is possible to recognize importance of the alarm and predict what type of deviation state has occurred, in addition to detection of the alarm.

(3) The display device includes a guidance picture configured to represent a deviation state and support information for dealing with the deviation state when the alarm is raised.

With this configuration, it is possible to correctly recognize the deviation state from the guidance picture, and according to the guidance picture, an operation for dealing with the alarm can be easily performed.

The display device includes a means configured to display a picture indicating that the guidance picture is prepared, when the alarm is raised.

With this configuration, when the alarm is raised, the operator can recognize that the picture for recognizing the deviation state and supporting how to deal with the deviation state is present.

(4) The picture switching means includes a means configured to display the guidance picture when the alarm is raised.

With this configuration, the picture switching means displays the guidance picture. In this case, the guidance picture can be automatically displayed.

The picture switching means includes a means configured to display the guidance picture or a picture indicating that the guidance picture is prepared, when an alarm having a predetermined rating is raised.

With this configuration, the support information can be displayed only for important alarm requiring guidance. Thereby, processing becomes simple in contrast to the case where guidances for all the alarms are presented. The operator can recognize that the alarm is important.

The guidance picture may be configured to represent a plurality of support information for dealing with the alarm.

With this configuration, a plurality of measures for dealing with the alarm can be presented, and the alarm can be dealt with appropriately.

(5) The guidance picture has a list picture configured to represent a list of a plurality of guidances.

With the list picture, it is possible to clearly know what guidance picture is prepared.

(6) The picture switching means includes a means configured to perform switching to a layer picture different from a layer picture being displayed or the guidance picture, by one touch operation on the layer picture being displayed.

With this configuration, since the picture switching can be performed by one touch operation, the picture switching can be quickly performed to display a desired picture.

BEST MODE FOR CARRYING OUT THE INVENTION

Hereinafter, an embodiment of the present invention will be described.

Figure 1:
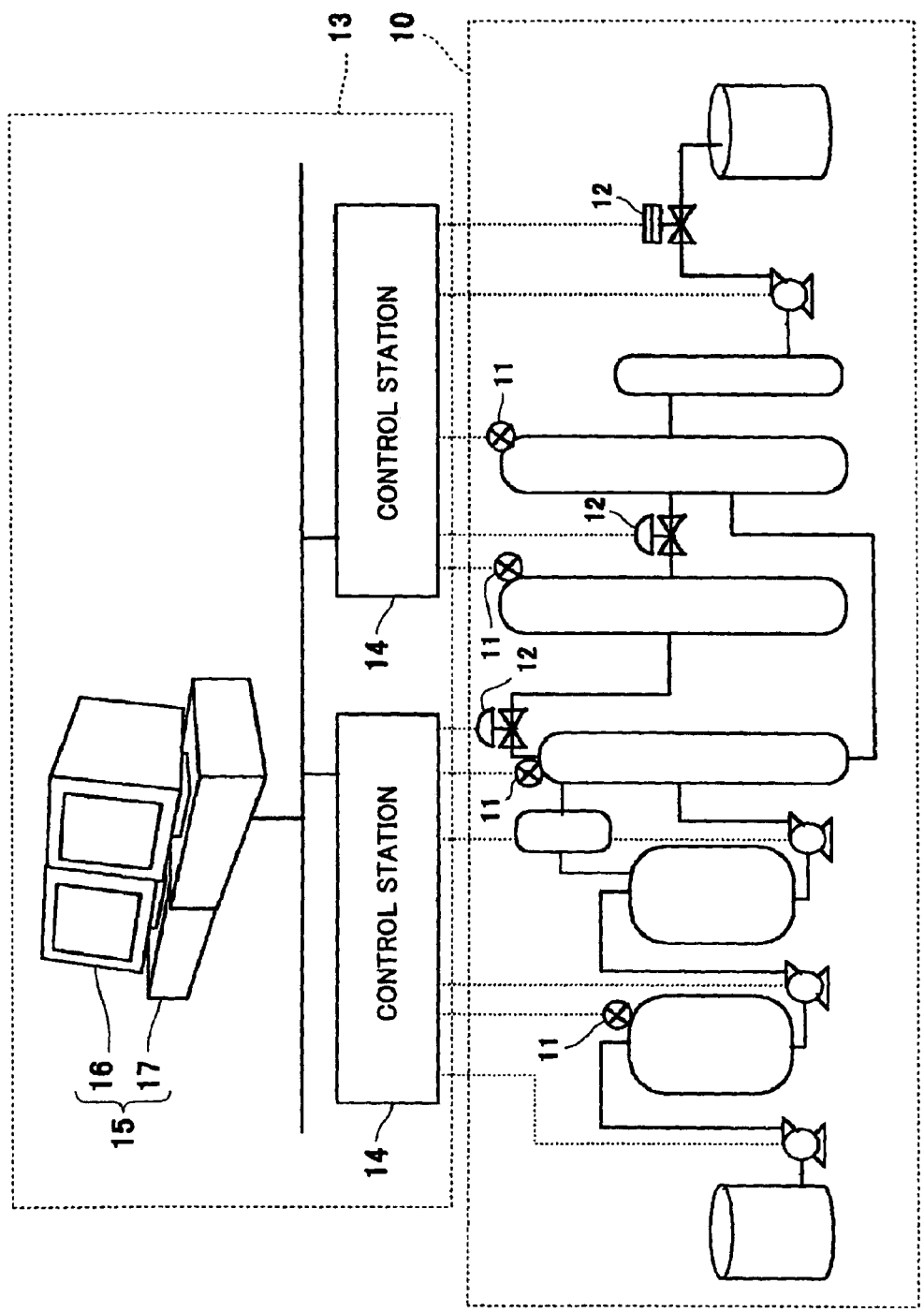
FIG. 1 is a schematic view showing a configuration of a plant control monitoring system according to an embodiment of the present invention.

FIG. 1 is a schematic view showing a configuration of a plant control monitoring system according to an embodiment of the present invention. In FIG. 1, a manufacturing plant 10 and a plant control monitoring system 13 for controlling the manufacturing plant 10 are independently illustrated.

In this embodiment, the plant 10 is an integrated producing plant for manufacturing chemical products. The plant 10 includes various devices or equipment. The devices or equipment include chemical rectors, distilling devices, heat exchangers, compressors, pumps, tanks, piping, and so forth. For each device or equipment, a sensor 11, an actuator of a valve 12 or the like, and the like are installed at predetermined locations. The sensor 11 includes a temperature indicator, a flow rate indicator, a pressure indicator, a liquid level indicator, a densitometer, and the like. The sensor 11 monitors an operating state (process state) of each device or equipment and outputs a signal indicative of the state.

The plant control monitoring system 13 manages and controls the operating state of the plant 10 and manages a producing state of the plant 10. The plant control monitoring system 13 comprises control stations 14 (processing units) and a display device 15. In this embodiment, a plurality of control stations 14 are provided. This is because a control system of the plant 10 is divided into a plurality of sections, each of which is controlled by the corresponding control station 14. Such a control configuration is called decentralized (distributed) control and the plant control monitoring system that executes the decentralized control is generally called a distributed control system (DCS). The distributed control system is widely used in various traffic monitoring control systems or environment control systems, in addition to various manufacturing plants or power plants.

The control station 14 receives the process state signal output from the sensor 11 or the like. Based on the signal, the control station 14 performs prescribed operation, and outputs a control signal (operation signal). In accordance with the control signal, the actuator of the valve 12 or the like, the device or equipment or the like is controlled.

The control station 14 contains a reference value (reference signal) corresponding to each device or equipment. The reference value is referenced for normal operation of the device or equipment. The control station 14 compares the process state signal to the reference signal. In some cases, the control station 14 performs a required operation using a plurality of process state signals and compares the resulting process signal to the reference signal. When judging that the operation of a device or equipment is in a deviation state, the control station 14 outputs an alarm signal and causes the display device 15 to display an alarm.

The devices or equipment are individually given tag numbers (identification numbers) to identify themselves. These tag numbers are set and stored by the control station 14. Input/output signals associated with the devices or equipment are managed by the control station 14 based on the tag numbers.

The display device 15 comprises a display 16 and a picture controller 17 (picture switching means 17). The display 16 displays a picture representing a process state of the plant 10. The picture controller 17 causes the display 16 to display the picture representing the process state, and performs switching of a picture displayed on the display 16 as desired. The display device 15 is configured to represent the process state signal by means of symbols as shown in the Figures.

The control system of the plant 10 is divided into the plurality of control sections (decentralized control), and each of the control sections is controlled by the corresponding control station 14. The control station 14 hierarchically divides the devices or equipment included in the plant 10 into predetermined groups. The predetermined groups refer to groups each including devices or equipment so as to be associated with one another within the plant 10. The display device 15 is capable of displaying a lowermost first layer picture and an upper layer picture in the hierarchically divided groups. This display device 15 has a picture structure capable of displaying a plurality of layer pictures. The first layer picture is a picture representing the operating state for each device or equipment. The upper layer picture refers to a picture representing the operating state of the group of devices or equipment associated with one another within the plant 10.

Figure 2:
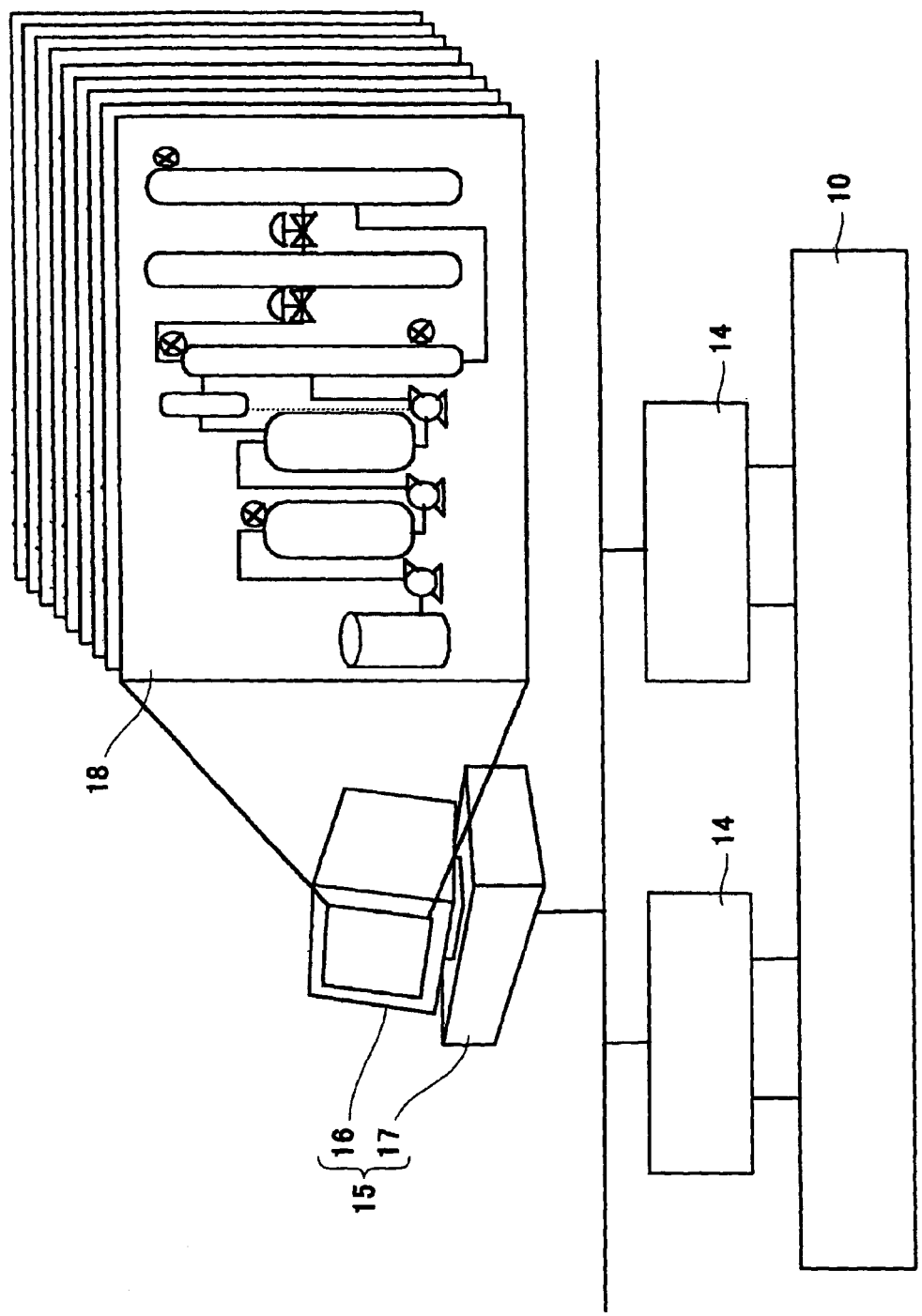
FIG. 2 is a view showing a picture displayed by a display device according to the embodiment of the present invention.

FIG. 2 shows a picture (graphic picture) 18 displayed by the display device 15. In FIG. 2, the above-identified first layer picture is displayed.

The graphic picture (first layer picture) 18 represents one of steps into which the plant 10 is divided in a process flow diagram (PFD) form (or P & ID form: piping & instrument diagram form). That is, the first layer picture 18 displays one step of the plant 10. The picture 18 is a detailed representation of the devices or equipment, sensors, and input/output signals associated with the devices or equipment by means of diagrams, texts, etc.

The display device 15 is capable of displaying the upper layer picture as described above. That is, the display device 15 has pictures representing the steps in the block form so that relation among the steps or flow of the steps within the plant 10 is known. These pictures are selected and displayed on the display 16 as desired. This picture switching is performed by the picture controller 17.

Figure 3:
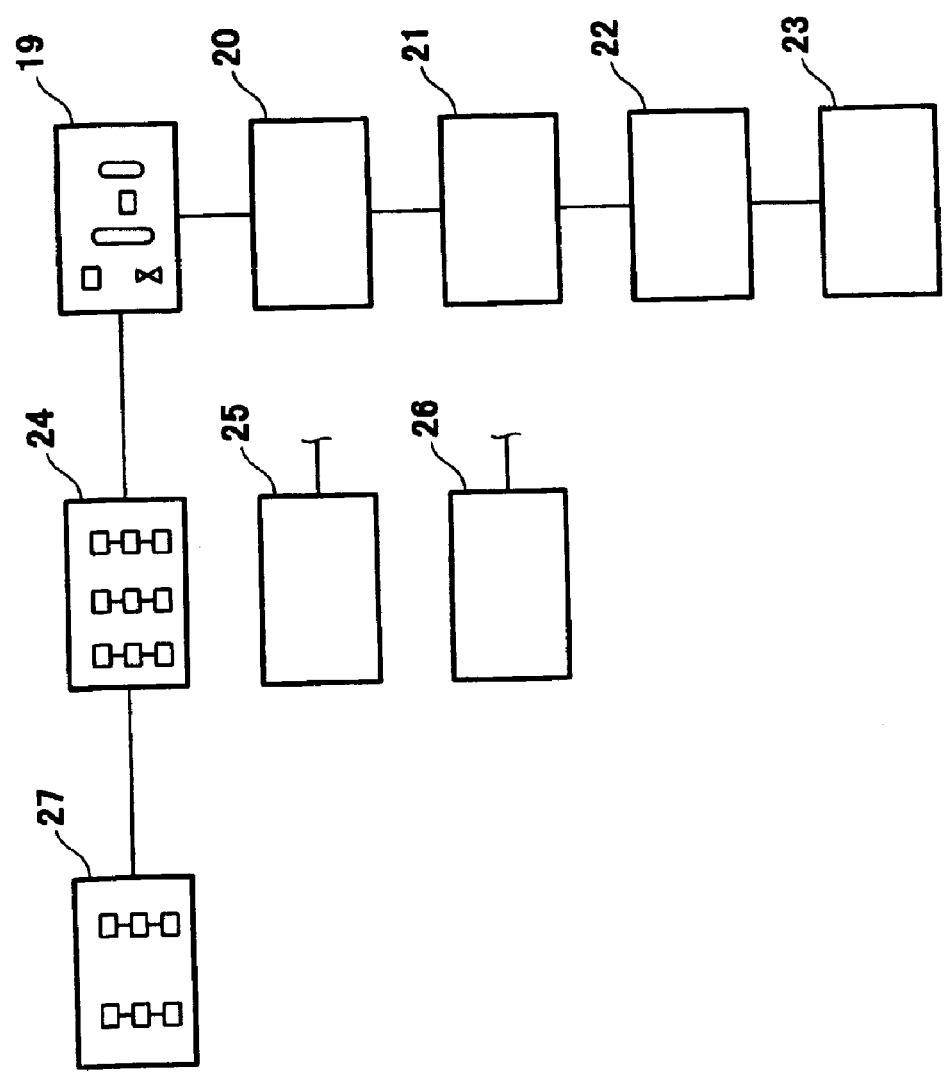
FIG. 3 is a view of a list of pictures capable of being displayed by the display device according to the embodiment of the present invention.

FIG. 3 is a view showing a list of pictures capable of being displayed by the display device 15. That is, a picture structure of the display device 15 is switched and displayed.

In FIG. 3, reference numerals 19 to 23 denote first layer pictures. In these pictures, the devices or equipment are grouped for each step so as to be associated with one another. By selecting one of the first layer pictures 19 to 23, the operation in the step corresponding to the picture is monitored. It should be appreciated that one step is not necessarily represented by one picture, but, for example, when one step includes a number of devices or equipment, the first layer picture may be divided into a plurality of pictures, or conversely, a plurality of steps may be represented by one picture.

Reference numerals 24 to 26 represent process-base layer pictures. In these pictures, the steps within the plant 10 are grouped for each process so as to be associated with one another. By selecting one of the process-base layer pictures 24 to 26, the operation of the process corresponding to the picture can be monitored. Reference numeral 27 denotes a plant layer picture. The picture represents a list of processes within the plant 10, and hence the entire plant 10.

In this embodiment, the entire plant 10 to be monitored by the operator is hierarchically divided and displayed according to a purpose of monitoring, an operator's role, or the like. The entire plant 10 is displayed by the plant-base layer picture 27 (upper layer picture), the process-base layer pictures 24 to 26 (upper layer pictures) and the first layer pictures 19 to 23.

Herein, the "plant" is comprised of the plurality of processes and is defined as a unit for manufacturing products. The "process" is comprised of the plurality of "steps" and is defined as a unit for controlling kinds or quantity of the products independently within the plant. With regard to plant related installation, such as auxiliary material or utility facility, the process may be defined for each function based on auxiliary material, utility, recovery, or the like. The "step" is comprised of a set of "a plurality of equipment" and is defined as having a chemical engineering unit function (e.g., unit operation function such as reaction, distillation, extraction, absorption, or drying). Minimum units of installation included in the plant is defined as the "equipment." The equipment include pumps, tanks, distillation towers, heat exchangers, compressors, refrigerators, reactors, driers, transports, valves (control valves, remote valves, or the like), etc. Piping or instruments include a temperature indicator, a flow rate indicator, a pressure indicator, a liquid level indicator, a densitometer, hygrometer, etc.

The picture structure of the display device 15 is not intended to be limited to the above. For example, a set of plural related plants may be defined as an "area" and an operating state of the "area" may be displayed as the "plant-base layer picture" as the upper layer picture of the process-base layer picture. In the same manner, it is possible to provide upper layer pictures of groups, representing a "factory" as the entire factory such as a set of plural plants or areas, a "manufactory" or a "factory group" as a set of several factories, etc. Such grouping may be suitably determined according to a purpose of monitoring the entire operation by the plant control monitoring system 13.

Figure 4:
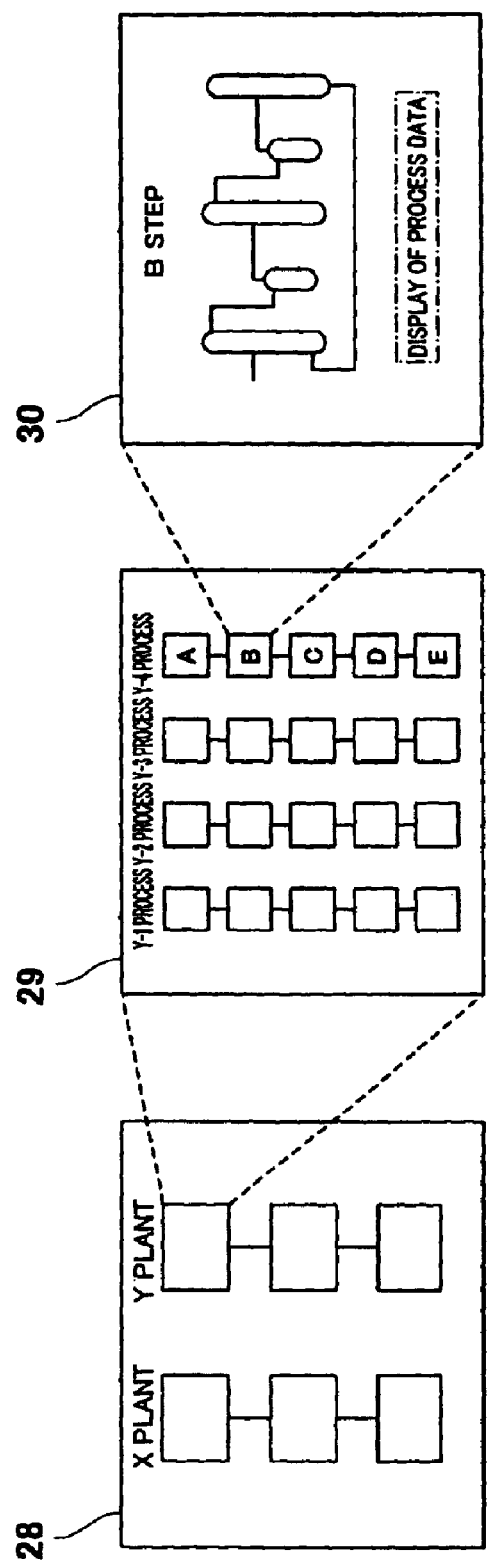
FIG. 4 is a view showing an example of picture switching by the display device according to the embodiment of the present invention.

FIG. 4 schematically shows an example of picture switching by the display device 15. In FIG. 4, the plant-base layer picture 27, the process-base layer picture 24 as a lower layer picture of the plant-base layer picture 27, and the first layer picture 20 as a lower layer picture of the process-base layer picture 24 are sequentially displayed.

FIG. 4 shows that control of two plants, i.e., a X plant and a Y plant are being monitored on the plant-base layer picture 27. The X plant and the Y plant are each divided into three sections on the picture. Each of the plants includes a plurality of processes. For example, in the Y plant, the section displayed in the uppermost stage includes Y-1 to Y-4 processes. Each of the processes is comprised of a plurality of steps A to E. In this case, the picture controller 17 switches the plant-base layer picture 27 to the process-base layer picture 24, or the like, and from the process-base layer picture 24 or the like, to the first layer picture 20, or the like.

Next, the pictures displayed by the display device 15 will be described in conjunction with their respective functions.

(1) Plant-Base Layer Picture

Figure 5:
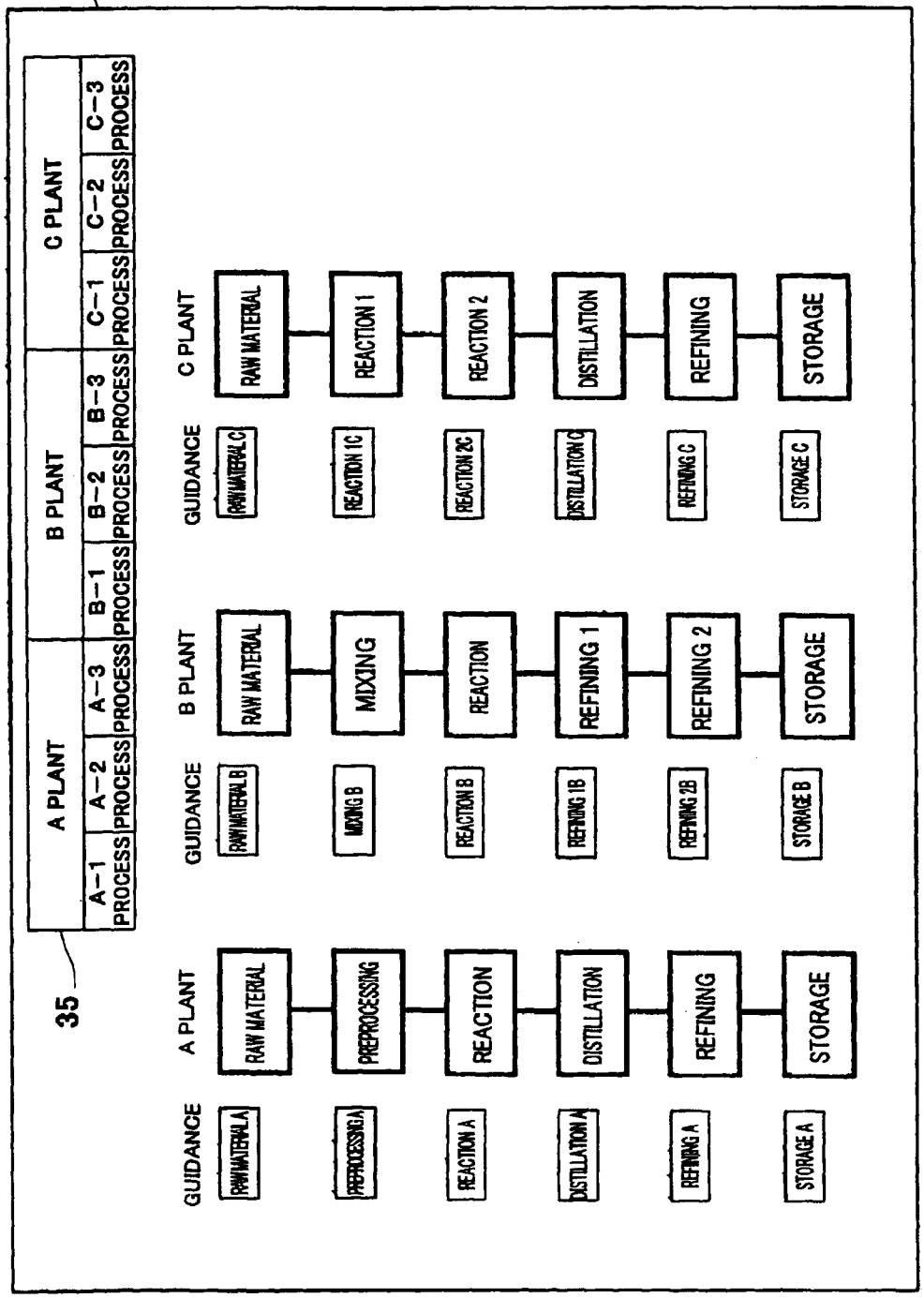
FIG. 5 is a view showing an example of an process-base layer picture.

FIG. 5 shows an example of the plant-base layer picture. The plant-base layer picture 31 represents that the operation is monitored for each plant. FIG. 5 shows that plants A to C are being monitored. Also, FIG. 5 represents each of the plants in a graphic form and processes or steps associated with one another within the plants in a block form. With this configuration, the flow of the processes within the plants can be monitored.

In the manner shown in FIG. 4, switching from the plant-base layer picture 31 to the process-base layer picture or the first layer picture is performed by touching or clicking a mouse on the process or step represented in the block form. The picture controller 17 allows picture switching by such one touch operation. By clicking the process represented in the block form, the process-base layer picture (see FIG. 6) representing the process is displayed.

When disorder or abnormality (deviation state) occurs in any one of the processes or steps within the plants, the control station 14 raises an alarm as described above. Simultaneously, the control station 14 changes color of the process or step which is represented in the block form or cause the same to blink. That is, the control station 14 changes a display configuration of the picture. The change in the display configuration might include only color change, color change and blinking, or only blinking. Hereinafter, the change in the display configuration is called "color change or the like."

In this embodiment, when the deviation state occurs, the alarms raised in an arbitrary process or step within the plant are grouped. When the alarm is raised in a step (e.g., alarm appears in the first layer picture 20 displayed in FIG. 4), color change or the like occurs in the process-base layer picture 24 (Y-4 process B in FIG. 4) and the plant-base layer picture 27 (uppermost stage of the Y plant in FIG. 4) which are associated with this step.

A condition for such grouping may be set. One condition is that alarms are grouped regardless of their kinds when they are raised. Another condition is that, when several predetermined deviation states occur (alarm is raised when the several deviation states simultaneously occur, instead of being raised independently for each deviation state), the alarms are grouped. It is judged that the alarm is raised based on one of these conditions, from the color change or the like, or change of blinking position. These conditions are easily set by system programming in the control station 14.

When the alarm is raised, blinking is displayed, and at the time when an operator has checked the alarm, the blinking may stop and display may continue.

Further, in this embodiment, alarms are rated in the order of importance according to the kind of the alarms. This rating is easily set by system programming in the control station 14. The rating of alarms is determined depending on effects of these alarms on safety, productivity, product quality, and the like of the plant. For example, the alarms may be displayed as red, orange, and yellow in the order of importance.

When a plurality of alarms are raised simultaneously within the same block, the alarm with higher importance is prioritized and displayed. Thereby, while the operation of the plant 10 is monitored, the alarm with higher importance is dealt with, with priority. Further, advantageously, in the case where an alarm with lower importance is raised and an alarm with higher importance is raised later, the operator does not miss the alarm with higher importance raised later.

Moreover, process data which is an important factor in operation management can be displayed on the plant-base layer picture 31. This allows the operation of the plant to be well monitored.

(2) Process-base Layer Picture

Figure 6:
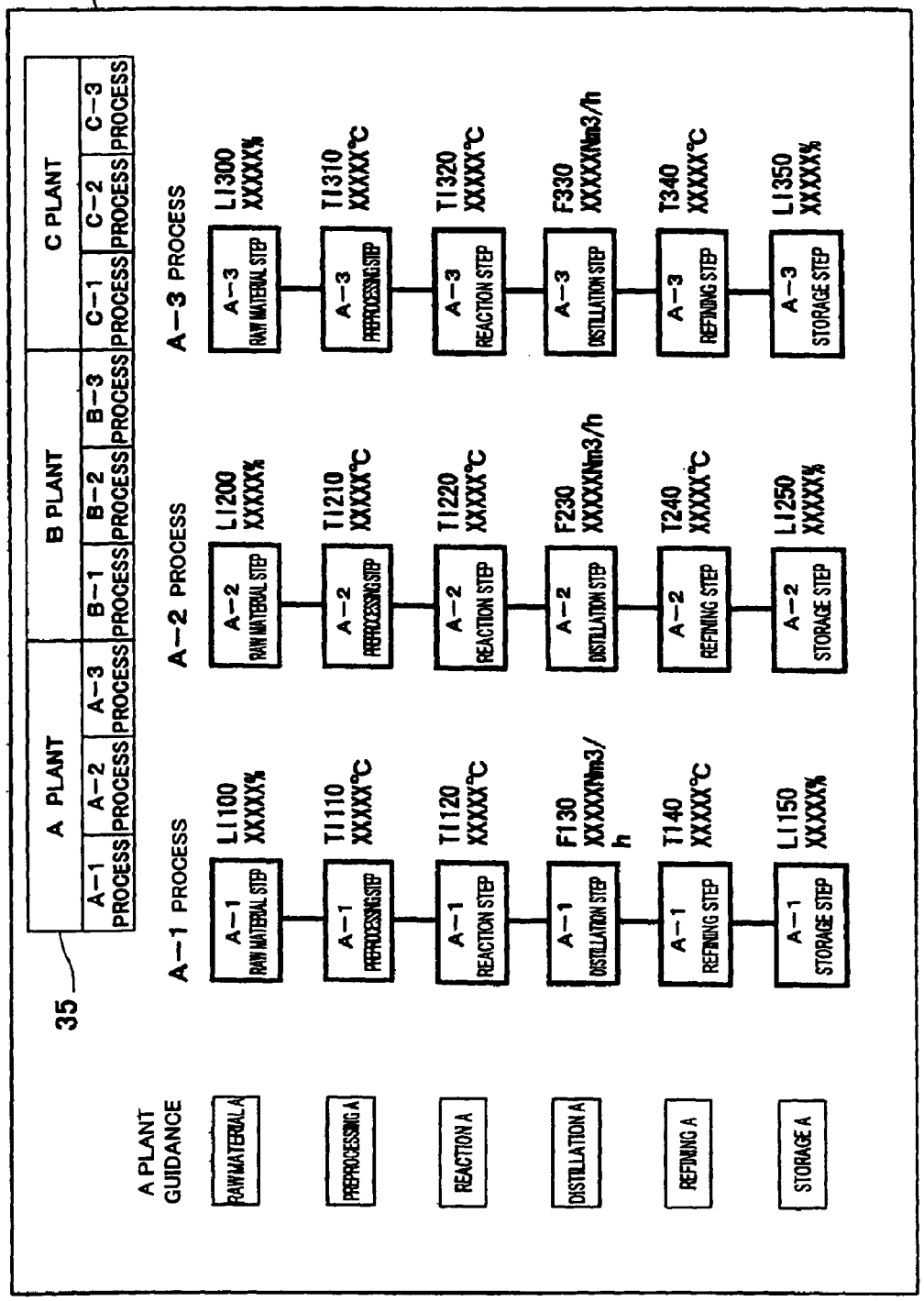
FIG. 6 is a view showing an example of a step-base layer picture.

FIG. 6 shows an example of a process-base layer picture. A process-base layer picture 32 represents various processes included in the plant A in FIG. 5 in the graphic form and steps in the processes in the block form. This picture allows a flow of processes to be monitored.

By touching or clicking a mouse on the step represented in the block form, i.e., by one touch, the process-base layer picture 32 is switched to a first layer picture (see FIG. 7) representing the step. The first layer picture is also represented in the graphic form as mentioned later.

When disorder or abnormality (deviation state) occurs in a step within each process, the control station 14 raises an alarm, and performs color change or the like of the portion displayed in the block form, as described above.

Also, when a deviation state occurs, the raised alarms are grouped, as described above. The condition for such grouping of the alarms can be set in the same manner as described above. One condition is that alarms are grouped regardless of their kinds when they are raised. Another condition is that, when several predetermined deviation states occur, (alarm is raised when the several deviation states simultaneously occur, instead of being raised independently for each deviation state), the alarms are grouped. It is judged that the alarm is raised based on one of the conditions, from the color change or the like, or change of blinking position. These conditions are easily set by system programming in the control station 14.

When the alarm is raised, blinking is displayed, and at the time when the operator has checked the alarm, the blinking may stop and display may continue.

Further, in this embodiment, the alarms are rated in the order of importance. This rating is easily set by system programming in the control station 14. The rating of alarms is determined depending on effects of these alarms on safety, productivity, product quality, and the like of the plant. For example, the alarms may be displayed as red, orange, and yellow in the order of importance.

When a plurality of alarms are raised simultaneously within the same block, the alarm with higher importance is prioritized and displayed. Further, as shown in FIG. 6, process data which is an important factor in operation management can be displayed on the process-base layer picture 32. This allows the operation of the plant to be well monitored.

(3) First Layer Picture

Figure 7:
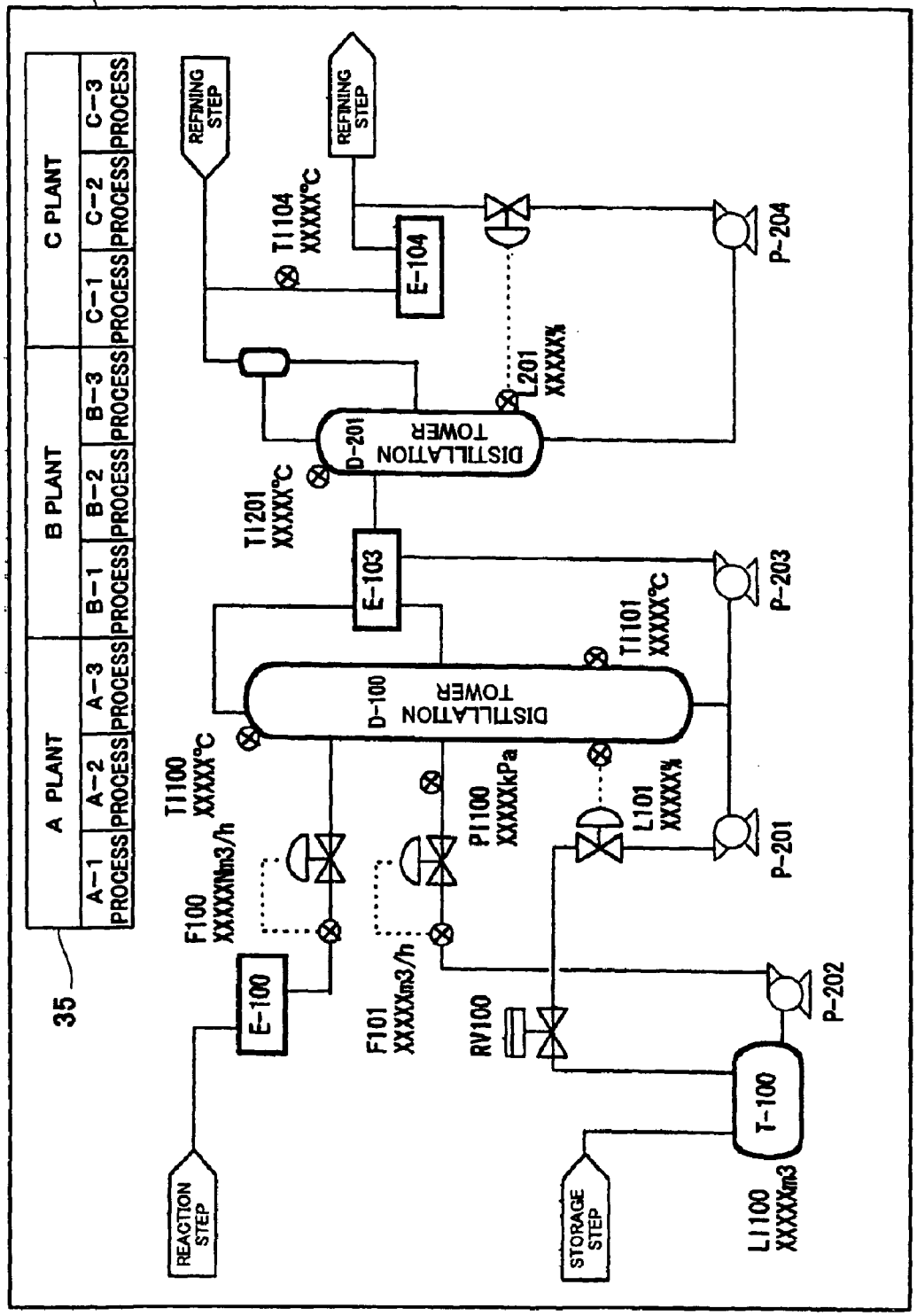
FIG. 7 is a view showing an example of a first layer picture.

FIG. 7 shows an example of a first layer picture. The first layer picture 33 is a graphic picture of a process flow diagram (PFD) in which a process flow of steps included in the plant A is described in a P& ID (piping & instrument diagram) form. This picture represents in detail devices or equipment and sensors for controlling these device or equipment and input/output signals of these devices or equipment by means of diagrams, symbols, texts, and so forth. The picture represents association among the devices or equipment and piping within each step, or flow of them.

It should be appreciated that one entire step is represented by the first layer picture 33, but one step may be divided into a plurality of first layer pictures, for example, when one step includes numerous devices or equipment.

In this embodiment, the process state of the device or equipment is represented based on signals output from the devices or equipment (process state signals). Thereby, in addition to monitoring an operation state of each step, control and producing states are managed. Also, means for automatically or manually operating an actuator of a valve or the like, the device or equipment, or the like, in accordance with a control output (operation signal) (i.e., operation or the like for dealing with the alarm) can be displayed on the picture. This allows the operation of the process to be monitored, or required judgment and operation to be carried out. Therefore, when an alarm is raised in the displayed step, the state of alarm is displayed by color change or the like of the diagram, symbol, text, and the like. In addition, information for dealing with the alarm is displayed.

The first layer picture 33 in FIG. 7 is provided with a means for performing switching to a picture necessary for monitoring the operation of the plant (another picture relating to the picture in FIG. 7). In other words, the first layer picture 33 is provided with a means for performing switching to a picture representing a subsequent or previous step of the step in this process, an operation picture for carrying out operation of the device or equipment belonging to the step, or pictures of the other associated steps. Besides, the picture 33 is provided with a means for performing switching to pictures in upper layers, such as a process or a plant to which the step belongs, which will be described in later.

The above-mentioned picture structure may be changed as follows. When the plant does not have a plurality of processes, or when the plant has the plurality of processes, but steps within the plant are few, depending on the scale or features of a target plant, a picture for each process may be dispensed with. In that case, a two-layer structure including the plant-base layer picture and the first layer picture, or a two-layer structure including a plurality of process-base layer pictures and the first layer picture may be set. In summary, depending on the scale of the plant, the picture structure for controlling and monitoring the plant may be layered as desired.

(4) The Other Function

As shown in FIGS. 5 to 7, the plant-base layer picture, the process-base layer picture, and the first layer picture have simple display portions 35 for simply displaying other processes, plants, and the like.

The simple display portions 35 are displayed on the plant-base layer picture and the like, by the display device 15. With regard to the simple display portion 35, the alarms are grouped in the manner described above. Therefore, when an alarm appears in a layer picture different from a layer picture being displayed, it is checked that the alarm has been raised, from color change or the like of the corresponding portion of the simple display portion 35. Thereby, the operator can immediately know which of layer pictures the alarm appears on. In addition, the operator can perform switching to that picture and perform a required operation.

An example of a display configuration of the simple display portion 35 is that, on each first layer picture, a process-base layer picture or a plant-base layer picture on an upper layer is simply displayed. Another example is that, on each process-base layer picture, a process-base layer picture or a plant-base layer picture on the same or upper layer is simply displayed. A further example is that, on each plant-base layer picture, a plant-base layer picture or a process-base layer picture on the same or lower layer is simply displayed. By touching or clicking the mouse on a layer group picture of the simple display portion 35, switching to this picture is achieved. This function is performed by the above-mentioned picture controller 17.

Figure 8:
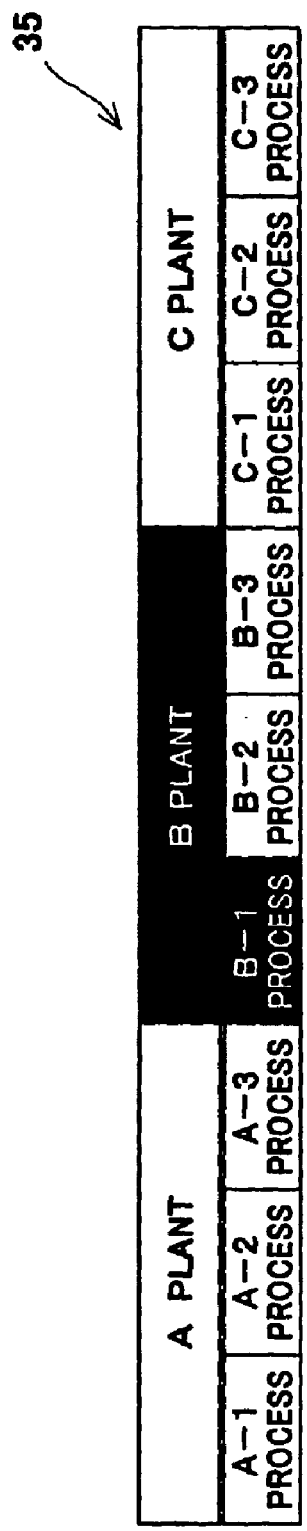
FIG. 8 is a view showing an example of a simple display portion.

FIG. 8 shows an example of the simple display portion 35. In FIG. 8, an event that the an alarm has been raised in a B-1 process of the plant B is represented by color change or the like of the simple display portion 35. By touching or clicking the mouse on this portion of the picture, switching to a plant-base layer picture including the plant B or an process-base layer picture including B-1 process in a lower layer can be performed.

The above-mentioned function dramatically extends the range of the plant 10 which can be monitored by one operator. In other words, a wider range of operation of the plant can be monitored with fewer pictures. In addition, a monitoring level can be standardized. Further, the operator would not miss a deviation state, and would find out disorder or abnormality of the plant 10 or a sign of it in an earlier stage. Moreover, the number of loops which may be monitored by one operator is increased.

Figure 9:
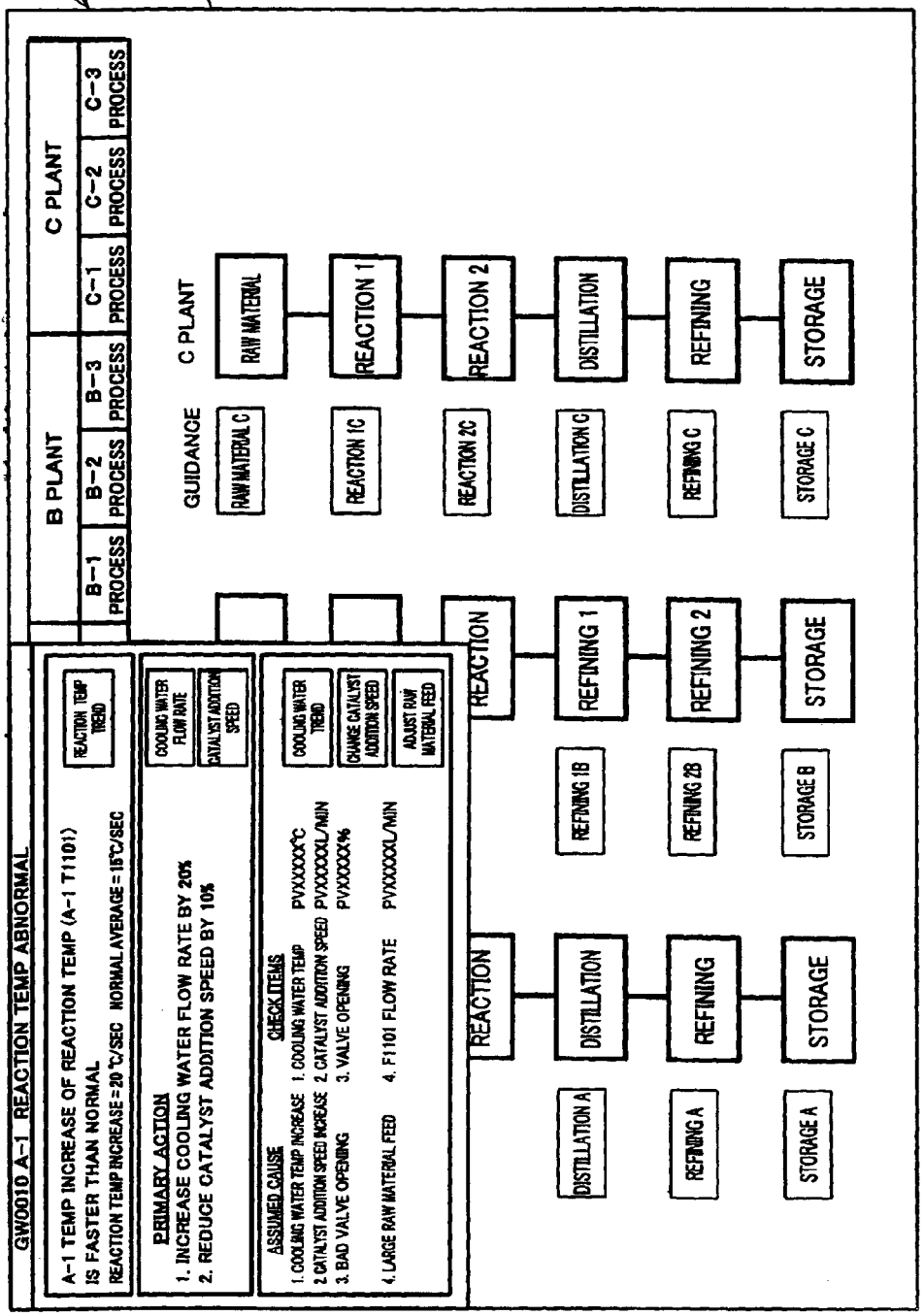
FIG. 9 is a view showing a guidance picture being displayed.

Then, in this embodiment, a guidance picture 36 mentioned later is displayed. The guidance picture serves to offer support information required for the operation of the plant 10 when the alarm is raised. As shown in FIG. 9, the guidance picture 36 displays information relating to specification of a cause of the alarm, detailed information relating to a content of the alarm, information relating to how to deal with the alarm or an operation required for dealing with the alarm, and the like.

When the alarm is raised, a fact that the guidance picture is present on each picture such as the plant-base layer picture, the process-base layer picture or the like is represented by means of a symbol or diagram. When the alarm is raised, the presence of a guidance picture corresponding to the alarm is known by color change or the like of the symbol or the diagram.

The color change or the like is performed such that the alarm is displayed as red, orange, and yellow in the order of importance of the alarm. When two or more alarms are raised simultaneously on a picture, a priority for dealing with the alarms is established.

Further, in this embodiment, by clicking the mouse on or touching the symbol or the diagram on the picture, the guidance picture appears. The above-identified picture controller 17 makes it possible to perform switching to the guidance picture by one touch. Since the guidance picture is displayed and the operator performs operation according to the guidance, the alarm can be easily dealt with regardless of an experience or skill of the operator.

The guidance picture is equipped with functions as described below.

The functions are to display detailed information by the guidance picture.

This will be described with reference to the guidance picture 36 in FIG. 9. The detailed information can be displayed on the guidance picture 36.

(a) Check of Content of Alarm

This function is to describe in detail the state of disorder or abnormality corresponding to the alarm. Also, the function has a means for switching to pictures required for displaying process data and the like associated with the alarm, and checking and judging a state of the alarm. That is, other pictures required for judgment is switched from this picture.

(b) Operation for Dealing with Alarm

This function is to display a content of an action required for dealing with the alarm. Also, the function is to display a picture representing an operation required for the action or a picture required for the operation. As in (a), the function is to display an operation method required for dealing with the alarm, a picture required for carrying out the method, or the like.

(c) Specification of Cause of Alarm

This function is to display data or the like relating to an alarm to allow a cause of the alarm to be checked. The function is to also display other pictures required for checking. Further, the function is to make setting so that the cause of the alarm is automatically specified. In this case, a program for automatically specifying the cause of the alarm is incorporated into a control station, a work station, or the like connected to the plant control monitoring system 13, and the result of the specified cause is displayed on the guidance picture.

(d) Display of Other Operating States

For example, a setting may be made so that a tray performance of a distillation tower in operation, a surging area of a compressor, or the like can be displayed. These information are difficult to represent only by means of numeric values or texts, and therefore, representation using a graph, a diagram, and so forth facilitates checking of them in real time. Thereby, all support information relating to operation and management of the plant 10 can be displayed as well as the information for dealing with disorder or abnormality of the plant 10 and the operation method, thus supporting the operation by the operator.

In the case where alarms requiring guidances are few, as soon as the alarm is raised, the corresponding guidance picture can be immediately displayed.

Figure 10:
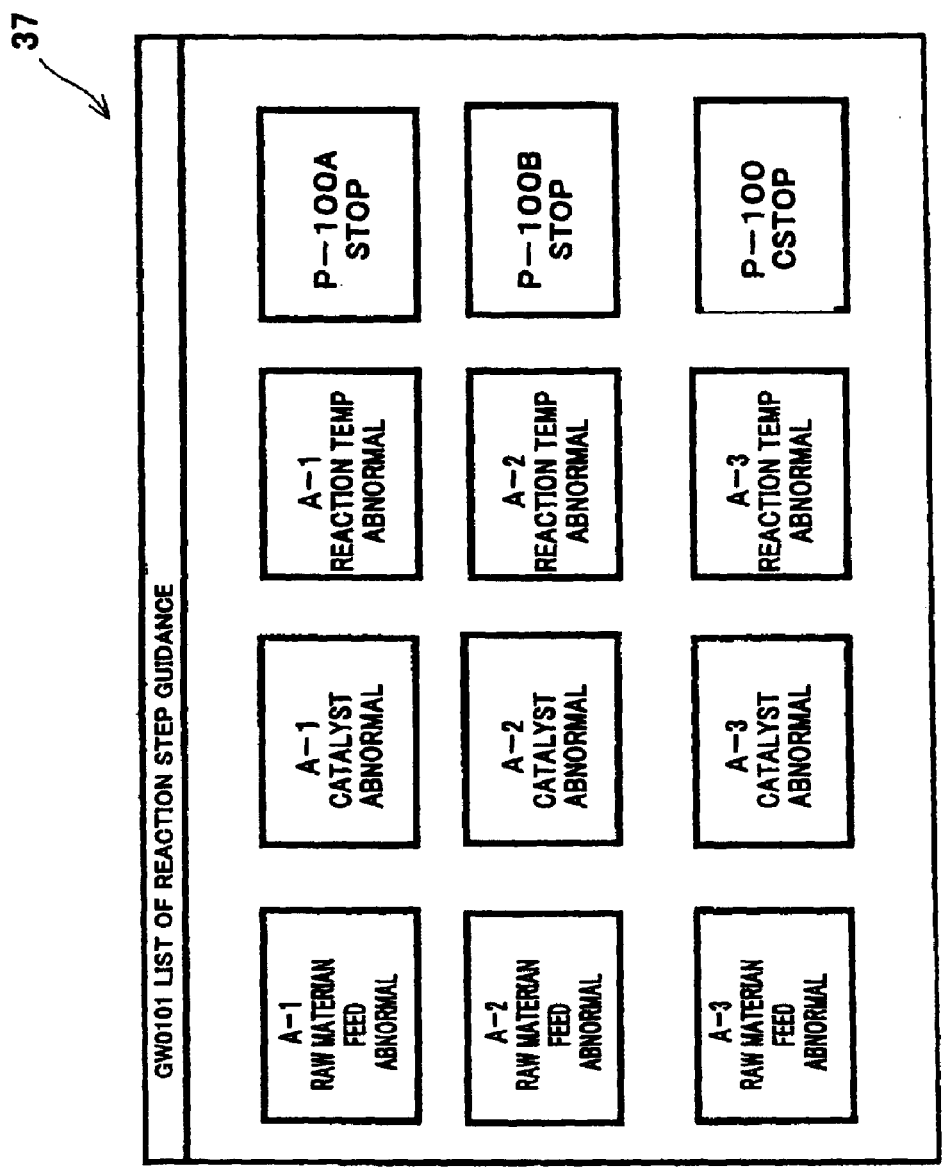
FIG. 10 is a view showing a list of guidance pictures.

As shown in FIG. 10, a list picture 37 of guidance may be provided. The list picture 37 is effective for the case where there are many alarms requiring guidances, and symbols or diagrams indicative of the presence of the guidance pictures 36, corresponding to the alarms, cannot be displayed in a one to one correspondence on a picture.

The list picture 37 provides an index of guidance corresponding to each alarm. The list picture 37 may be first displayed and then switched to a required guidance picture 36.

This method is more effective where the picture in the upper layer such as the plant-base layer picture or the process-base layer picture is displayed, that is, where a picture displays a great many alarms by including a plurality of devices or equipment, or a number of processes and steps.

Figure 11:
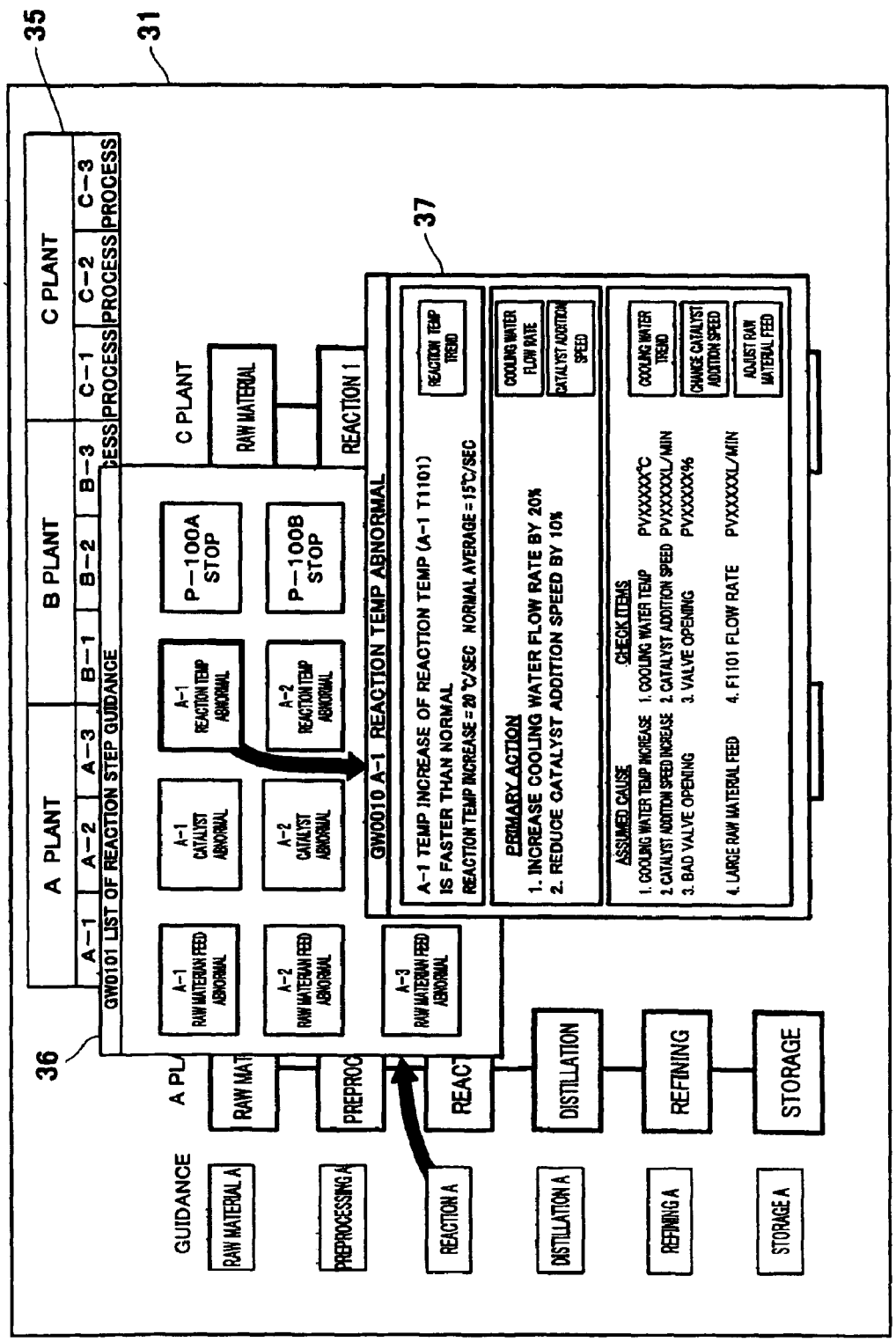
FIG. 11 is a view showing how the guidance picture is switched.

When the list picture 37 of guidance is switched to the guidance picture 36, the above mentioned picture controller 17 may be used. The outline is shown in FIG. 11.

This operation may be performed by one touch operation, such as touching (pointing to) or clicking a mouse on the picture. Further, the operator can know the presence of guidance by color change or the like of the portion to be displayed in the list picture 37. The use of the list picture 37 of such guidance allows the guidance pictures 36 corresponding to a number of alarms to be displayed on each layer picture.

The guidance picture 36 or the list picture 37 of guidance may be displayed, for example, on the display 16 on which the plant-base layer picture, the process-base layer picture, the first layer picture, or the like is displayed, for example, in an overlapped state in a window format. This is achieved by using a general window format in a computer system.

In addition, the picture switching is freely performed. This function allows the operator to operate the plant 10 or perform an operation for dealing with the alarm on a picture other than the guidance picture, while checking the content of the guidance.

As should be appreciated from the foregoing, the alarm can be dealt with quickly and appropriately using the guidance picture 36 without skills of the operator. This is because the guidance picture 36 eliminates a need for the operator to learn causes of the alarms, operations for checking the alarms, etc.

Besides, since the alarms are grouped and the picture is quickly switched, the operator need not predict or remember the picture on which the alarm appears. This eliminates difference in the operations due to variation in skills of operators, and hence standardizes operation, judgment, and handling. Further, a monitor range per operator can be extended and control of the plant 10 is monitored with high precision.

INDUSTRIAL APPLICABILITY

As should be appreciated from the foregoing, in accordance with the present invention, the following effects are provided.

(1) Since the display device has a picture structure of a plurality of layers and picture switching is performed as desired, the operator need not remember the pictures, unlike the prior arts. When the alarm is raised, the picture including the device or equipment in a deviation state can be simply displayed regardless of experience or skill of the operator. Consequently, the operator can quickly and accurately detect disorder or abnormality in the process state which has occurred in the plant.

(2) In particular, the guidance picture configured to represent the alarm state and support information for dealing with the alarm, allows the operator to know what deviation state has occurred, and appropriate means for dealing with the alarm can be carried out irrespective of the experience or skill of the operator. This standardizes the operation for dealing with the alarm and hence operation and management of the plant.

(3) In addition, since picture switching is performed by one touch operation, and the picture including the device or equipment in the deviation state can be quickly displayed irrespective of the experience or skill of the operator, the means for dealing with the alarm can be carried out quickly and appropriately irrespective of experience or skill of the operator.

What is claimed is:

1. A plant control monitoring system comprising:
a display device configured to display operating states of a plurality of devices or equipment included in each process of a plant by using predetermined symbols; and
a processing unit having an alarm output portion for outputting an alarm signal and causing the display device to display an alarm, when judging that an operation of a device or equipment is in a deviation state;
the display device including:
a first layer picture configured to represent an operating state for each device or equipment, and an upper layer picture configured to represent an operating state for each of groups into which devices or equipment are hierarchically divided so as to be associated with one another;
a simple display means for simply displaying a simple display portion configured to simply display an operating state of a lower layer group, the same layer group, or an upper layer group, on the first layer picture or the upper layer picture; and
a picture switching means for switching picture display as desired.

2. The plant control monitoring system according to claim 1, wherein
the upper layer picture includes at least:
a plant-base layer picture configured to represent the entire plant as having groups into which steps represented by the first layer pictures are divided so as to be associated with one another.

3. The plant control monitoring system according to claim 1, wherein
the upper layer picture includes at least:
a process-base layer picture configured to represent groups into which steps represented by the first layer pictures are divided for each process; and
a plant-base layer picture configured to represent processes represented by the process-base layer pictures as being integrated for each plant.

4. The plant control monitoring system according to claim 1, wherein
the alarm output portion includes:
an alarm grouping means configured to display the alarm in a first layer picture associated with the alarm and an upper layer picture associated with the first layer picture, when outputting the alarm signal.

5. The plant control monitoring system according to claim 4, wherein
the alarm grouping means includes:
a display configuration changing means for changing a display configuration according to importance of the alarm.

6. The plant control monitoring system according to claim 1, wherein
the display device includes:
a guidance picture configured to represent a deviation state and support information for dealing with the deviation state, when the alarm is raised.

7. The plant control monitoring system according to claim 5, wherein
the display device includes:
a guidance picture configured to represent a deviation state and support information for dealing with the deviation state, when the alarm is raised.

8. The plant control monitoring system according to claim 6, wherein
the display device includes:
a means configured to display a picture indicating that the guidance picture is prepared, when the alarm is raised.

9. The plant control monitoring system according to claim 7, wherein
the display device includes:
a means configured to display a picture indicating that the guidance picture is prepared, when the alarm is raised.

10. The plant control monitoring system according to claim 6, wherein
the picture switching means includes:
a means configured to display the guidance picture, when the alarm is raised.

11. The plant control monitoring system according to claim 7, wherein
the picture switching means includes:
a means configured to display the guidance picture, when the alarm is raised.

12. The plant control monitoring system according to claim 8, wherein
the picture switching means includes:
a means configured to display the guidance picture, when the alarm is raised.

13. The plant control monitoring system according to claim 9, wherein
the picture switching means includes:
a means configured to display the guidance picture when the alarm is raised.

14. The plant control monitoring system according to claim 10, wherein
the picture switching means includes:
a means configured to display the guidance picture or a picture indicating that the guidance picture is prepared, when an alarm having a predetermined rating is raised.

15. The plant control monitoring system according to claim 11, wherein
the picture switching means includes:
a means configured to display the guidance picture or a picture indicating that the guidance picture is prepared, when an alarm having a predetermined rating is raised.

16. The plant control monitoring system according to claim 12, wherein
the picture switching means includes:
a means configured to display the guidance picture or a picture indicating that the guidance picture is prepared, when an alarm having a predetermined rating is raised.

17. The plant control monitoring system according to claim 13, wherein
the picture switching means includes:
a means configured to display the guidance picture or a picture indicating that the guidance picture is prepared, when an alarm having a predetermined rating is raised.

18. The plant control monitoring system according to claim 6, wherein the guidance picture is configured to represent a plurality of support information for dealing with the alarm.

19. The plant control monitoring system according to claim 7, wherein the guidance picture is configured to represent a plurality of support information for dealing with the alarm.

20. The plant control monitoring system according to claim 8, wherein the guidance picture is configured to represent a plurality of support information for dealing with the alarm.

21. The plant control monitoring system according to claim 9, wherein the guidance picture is configured to represent a plurality of support information for dealing with the alarm.

22. The plant control monitoring system according to claim 10, wherein the guidance picture is configured to represent a plurality of support information for dealing with the alarm.

23. The plant control monitoring system according to claim 11, wherein the guidance picture is configured to represent a plurality of support information for dealing with the alarm.

24. The plant control monitoring system according to claim 12, wherein the guidance picture is configured to represent a plurality of support information for dealing with the alarm.

25. The plant control monitoring system according to claim 13, wherein the guidance picture is configured to represent a plurality of support information for dealing with the alarm.

26. The plant control monitoring system according to claim 14, wherein the guidance picture is configured to represent a plurality of support information for dealing with the alarm.

27. The plant control monitoring system according to claim 15, wherein the guidance picture is configured to represent a plurality of support information for dealing with the alarm.

28. The plant control monitoring system according to claim 16, wherein the guidance picture is configured to represent a plurality of support information for dealing with the alarm.

29. The plant control monitoring system according to claim 17, wherein the guidance picture is configured to represent a plurality of support information for dealing with the alarm.

30. The plant control monitoring system according to claim 6, wherein the guidance picture has a list picture configured to represent a list of a plurality of guidances.

31. The plant control monitoring system according to claim 7, wherein the guidance picture has a list picture configured to represent a list of a plurality of guidances.

32. The plant control monitoring system according to claim 8, wherein the guidance picture has a list picture configured to represent a list of a plurality of guidances.

33. The plant control monitoring system according to claim 9, wherein the guidance picture has a list picture configured to represent a list of a plurality of guidances.

34. The plant control monitoring system according to claim 10, wherein the guidance picture has a list picture configured to represent a list of a plurality of guidances.

35. The plant control monitoring system according to claim 11, wherein the guidance picture has a list picture configured to represent a list of a plurality of guidances.

36. The plant control monitoring system according to claim 12, wherein the guidance picture has a list picture configured to represent a list of a plurality of guidances.

37. The plant control monitoring system according to claim 13, wherein the guidance picture has a list picture configured to represent a list of a plurality of guidances.

38. The plant control monitoring system according to claim 14, wherein the guidance picture has a list picture configured to represent a list of a plurality of guidances.

39. The plant control monitoring system according to claim 15, wherein the guidance picture has a list picture configured to display a list of a plurality of guidances.

40. The plant control monitoring system according to claim 16, wherein the guidance picture has a list picture configured to represent a list of a plurality of guidances.

41. The plant control monitoring system according to claim 17, wherein the guidance picture has a list picture configured to represent a list of a plurality of guidances.

42. The plant control monitoring system according to claim 18, wherein the guidance picture has a list picture configured to represent a list of a plurality of guidances.

43. The plant control monitoring system according to claim 19, wherein the guidance picture has a list picture configured to represent a list of a plurality of guidances.

44. The plant control monitoring system according to claim 20, wherein the guidance picture has a list picture configured to represent a list of a plurality of guidances.

45. The plant control monitoring system according to claim 21, wherein the guidance picture has a list picture configured to represent a list of a plurality of guidances.

46. The plant control monitoring system according to claim 22, wherein the guidance picture has a list picture configured to represent a list of a plurality of guidances.

47. The plant control monitoring system according to claim 23, wherein the guidance picture has a list picture configured to represent a list of a plurality of guidances.

48. The plant control monitoring system according to claim 24, wherein the guidance picture has a list picture configured to represent a list of a plurality of guidances.

49. The plant control monitoring system according to claim 25, wherein the guidance picture has a list picture configured to represent a list of a plurality of guidances.

50. The plant control monitoring system according to claim 26, wherein the guidance picture has a list picture configured to represent a list of a plurality of guidances.

51. The plant control monitoring system according to claim 27, wherein the guidance picture has a list picture configured to represent a list of a plurality of guidances.

52. The plant control monitoring system according to claim 28, wherein the guidance picture has a list picture configured to represent a list of a plurality of guidances.

53. The plant control monitoring system according to claim 29, wherein the guidance picture has a list picture configured to represent a list of a plurality of guidances.

54. The plant control monitoring system according to claim 1, wherein the picture switching means includes:

a means configured to perform switching to a layer picture different from a layer picture being displayed, or the guidance picture, by one touch operation on the layer picture being displayed.

\* \* \* \* \*

UNITED STATES PATENT AND TRADEMARK OFFICE
CERTIFICATE OF CORRECTION

| | |
|---|---|
| PATENT NO. | : 6,892,107 B2 |
| APPLICATION NO. | : 10/399726 |
| DATED | : May 10, 2005 |
| INVENTOR(S) | : Takaharu Baba et al. |

It is certified that error appears in the above-identified patent and that said Letters Patent is hereby corrected as shown below:

On the Title Page:

Item (54), "PLANT CONTROL MONITOR" should be -- PLANT CONTROL MONITORING SYSTEM --.

In the Drawings:

At Sheet 10, Fig. 10, step A-1, "MATERIAN" should be -- MATERIAL --.

At Sheet 10, Fig. 10, step A-2, "MATERIAN" should be -- MATERIAL --.

At Sheet 10, Fig. 10, step A-3, "MATERIAN" should be -- MATERIAL --.

At Sheet 11, Fig. 11, field 36, step A-1, "MATERIAN" should be -- MATERIAL --.

At Sheet 11, Fig. 11, field 36, step A-2, "MATERIAN" should be -- MATERIAL --.

At Sheet 11, Fig. 11, field 36, step A-3, "MATERIAN" should be -- MATERIAL --.

In the Specification:

Column 1, line 1, "PLANT CONTROL MONITOR" should be -- PLANT CONTROL MONITORING SYSTEM --.

Column 1, line 33, "etc," should be -- etc., --.

Column 1, line 37, "these" should be -- this --.

Column 2, lines 22-24, "On the other hand, when disorder or abnormality of the process state that has occurred in the plant causes alarms relating to a number of instruments in a chain reaction." should be -- On the other hand, disorder or abnormality of the process state can occur in the plant causing alarms relating to a number of instruments in a chain reaction.--.

Column 2, line 31, "these" should be -- this --.

Column 2, lines 54-55, "then which of points being measured abnormality" should be -- then which of the points being measured that the abnormality --.

UNITED STATES PATENT AND TRADEMARK OFFICE
CERTIFICATE OF CORRECTION

PATENT NO. : 6,892,107 B2
APPLICATION NO. : 10/399726
DATED : May 10, 2005
INVENTOR(S) : Takaharu Baba et al.

It is certified that error appears in the above-identified patent and that said Letters Patent is hereby corrected as shown below:

Column 2, line 58, "(1) According" should be -- According --.

Column 2, line 60, "stales" should be -- states --.

Column 5, line 29, "rectors" should be -- reactors --.

Column 7, line 29, "include" should be -- includes --.

Column 9, line 54, "device" should be -- devices --.

Column 10, line 22, "described in later." should be -- described later --.

Column 11, lines 2-3, "an process-base" should be -- a process-base --.

Column 12, lines 12-13, "These information are" should be -- This information is --.

<u>In the Claims:</u>

Column 13, line 51, "of groups" should be -- of the groups --.

Signed and Sealed this

Twenty-fifth Day of March, 2008

JON W. DUDAS
*Director of the United States Patent and Trademark Office*